United States Patent [19]

Morita

[11] 4,387,168
[45] Jun. 7, 1983

[54] ADHESIVE COMPOSITION COMPRISING A FLUORINE CONTAINING ELASTOMER AND FIBRATED PTFE

[75] Inventor: Shigeru Morita, Osaka, Japan

[73] Assignee: Daikin Kogyo Co., Ltd., Osaka, Japan

[21] Appl. No.: 305,686

[22] Filed: Sep. 25, 1981

[30] Foreign Application Priority Data

Sep. 26, 1980 [JP] Japan ................................ 55-134834

[51] Int. Cl.$^3$ ...................... C08L 27/16; C08L 27/18; C08L 27/20; C08L 27/10
[52] U.S. Cl. ...................................... 521/54; 521/55; 521/134; 525/198; 525/199; 525/200
[58] Field of Search ............................ 525/199; 521/54

[56] References Cited

U.S. PATENT DOCUMENTS

| | | | |
|---|---|---|---|
| 3,005,795 | 10/1961 | Busse et al. | 525/199 |
| 3,019,206 | 1/1962 | Robb | 525/199 |
| 3,294,871 | 12/1966 | Schmitt et al. | 525/199 |
| 3,838,092 | 9/1974 | Vogt et al. | 525/199 |
| 3,904,575 | 9/1975 | Satokawa et al. | 525/199 |

*Primary Examiner*—Carman J. Seccuro
*Attorney, Agent, or Firm*—Birch, Stewart, Kolasch & Birch

[57] ABSTRACT

An adhesive composition comprising a low molecular weight fluorine-containing elastomer and fibrillated polytetrafluoroethylene, which is excellent in chemical resistance and weather resistance.

4 Claims, No Drawings

ADHESIVE COMPOSITION COMPRISING A FLUORINE CONTAINING ELASTOMER AND FIBRATED PTFE

The present invention relates to an adhesive composition. More particularly, it relates to an adhesive composition comprising a low molecular weight fluorine-containing elastomer and having excellent chemical resistance and weather resistance.

Hitherto, it is known that a low molecular weight fluorine-containing elastomer having a flowing property at a temperature of room temperature to 100° C. has an adhesive property. Since, however, such elastomer is weak in cohesive power, cohesive failure tends to occur. Thus, it is not suitable in practical use as an adhesive composition.

As a result of extensive study, it has now been found that a low molecular weight fluorine-containing elastomer loses its flowing property when incorporated with fibrillated polytetrafluoroethylene (hereinafter referred to as "PTFE"), but the resulting mixture shows a good adhesive property. Further, such mixture scarcely exhibits cohesive failure. Thus, said mixture is quite suitable for use as an adhesive agent.

According to the present invention, there is provided an adhesive composition comprising a low molecular weight fluorine-containing elastomer and fibrillated PTFE, which is excellent in chemical resistance and weather resistance. The adhesive composition of the invention shows a good adhesive property onto plastics, metals, glasses, papers, wooden materials, etc. at room temperature. It is particularly notable that such composition has an excellent adhesive property onto fluorine-containing resins.

The good adhesive property of the adhesive composition of the invention is probably attributed to a favorable affinity between the elastomer and PTFE, which prevents cohesive failure.

The elastomer as one of the essential components in the adhesive composition of the invention may be any fluorine-containing elastic polymer, of which examples include copolymers of vinylidene fluoride and at least one of other fluorine-containing ethylenically unsaturated monomers such as tetrafluoroethylene, trifluorochloroethylene, trifluoroethylene, hexafluoropropylene, pentafluoropropylene, perfluoro(methyl vinyl ether), perfluoro(ethyl vinyl ether) and perfluoro(propyl vinyl ether). In addition to these fluorine-containing ethylenically unsaturated monomers, the elastomer may comprise any ethylenically unsaturated monomer(s) containing no fluorine atom, of which examples are ethylene, propylene, etc. Alternatively, the elastomer may be tetrafluoroethylene/propylene elastic copolymers, fluorinated rubbers modified with iodine or bromine, fluorinated rubbers bearing halogen, halogenated alkyl, amino, aminoalkyl, hydroxyl, mercapto, silyl, unsaturation, etc. at the terminal positions, etc. Some typical examples of them are disclosed in Japanese Patent Publication (unexamined) No. 125,491/78 and Japanese Patent Publication (examined) No. 1585/79. Among them, particularly preferred is the one having iodine atoms in a content of 0.01 to 5% by weight and/or bromine atoms in a content of 0.05 to 1.5% by weight.

In order that the adhesive composition of the invention has a practically sufficient adhesive property, the elastomer used therein is required to have a low molecular weight, usually from 1,000 to 50,000, preferably from 3,000 to 10,000. When the molecular weight is too small, the elastomer bleeds out to stain the surface to which the adhesive composition has been applied. When the molecular weight is too large, the adhesive property is lost.

PTFE as the other essential component may be any one which can be fibrillated when any mechanical action such as kneading or stretching is applied thereto. In general, its number average molecular weight is preferred to be not less than about 300,000.

In the adhesive composition, the weight proportion of the elastomer and PTFE is usually from 50:1 to 1:1, preferably from 20:1 to 4:1. When the amount of the elastomer is larger than the upper limit, cohesive failure tends to occur. When the amount is smaller than the lower limit, the adhesive property is deteriorated.

In addition to the said essential components, the adhesive composition may comprise any additive(s) when desired. For instance, a filler conventionally employed in adhesive compositions such as viscous resins, metal oxides, metal salts, carbon or silica is frequently incorporated therein. Further, for instance, a softening agent, an oxidation inhibitor, a vulcanizing agent, etc. may be incorporated.

The adhesive composition of the invention may be prepared, for instance, by admixing the elastomer with powdery PTFE in the presence or absence of any liquid medium and kneading the resultant mixture until PTFE is fibrillated. Alternatively, the elastomer may be impregnated into microporous tapes, sheets, films, etc. made of PTFE to make the adhesive composition of the invention. In the latter case, the elastomer-impregnated tapes, sheets, films, etc. may be used by themselves as adhesive materials. Even if they adhere to each other, their separation can be accomplished with ease.

The elastomer in the adhesive composition may be vulcanized by incorporating therein a vulcanizing agent conventionally used for vulcanization of fluorine-containing elastomers. Control of the amount of the vulcanizing agent makes it possible to accomplish partial vulcanization. Usually, the amount of the vulcanizing agent to be incorporated may be from 0.5 to 10% by weight to the total weight of the adhesive composition. When the amount is too much, the adhesive property is lost after vulcanization. The use of the vulcanizing agent is effective in modifying the physical properties of the adhesive composition within a broad range, and it is possible to make the adhesive composition non-flowable.

As stated above, the adhesive composition of the invention shows excellent chemical resistance and weather resistance. Therefore, the outstanding performances of the elastomer and PTFE can be sufficiently utilized by its use. For instance, it may be used as an adhesive agent, a sealing agent, a packing material or a reinforcing material at a local position in apparatuses and instruments to be employed for treatment of corrosive chemicals. It is particularly notable that the adhesive composition exerts a desirable adhesive property onto fluorinated resins such as PTFE, chlorotrifluoroethylene polymer, tetrafluoroethylene/hexafluoropropylene copolymer, vinylidene fluoride polymer and vinyl fluoride polymer. When, for instance, a fluorinated resin tape having an adhesive layer consisting of the adhesive composition of the invention on the surface is adhered on any substrate material such as plastics, metals, glasses, wooden materials and papers and then the tape is peeled off, the adhesive layer is retained on the tape without transfer to the substrate material.

In the adhesive composition of the invention, the fibrillated PTFE prevents the flowing property of the elastomer. Therefore, the resistance to flowing is sufficiently high without the incorporation of any vulcanizing agent or a filler.

The present invention will be illustrated more in detail by the following Examples and Comparative Examples, in which part(s) are by weight unless otherwise indicated. The fluorine-containing elastomer employed in a copolymer of vinylidene fluoride and hexafluoropropylene in a molar ratio of 78:22.

EXAMPLE 1

A low molecular weight fluorine-containing elastomer having a number average molecular weight of 5,500 (80 parts) and PTFE fine powder (20 parts) were mixed and kneaded well until PTFE was fibrillated.

The thus obtained composition was applied on a surface of polyethylene, polyvinyl chloride or glass, whereupon a good adhesion was observed. Then, the composition was peeled off by hand, and good separation without transfer to the surface was observed.

The composition was applied on a PTFE tape and dipped in conc. sulfuric acid for 24 hours but deterioration or separation was not observed.

EXAMPLE 2

An aqueous dispersion of a low molecular weight fluorine-containing elastomer having a number average molecular weight of 5,500 and an aqueous dispersion of PTFE were mixed to obtain a mixture containing 80 parts of the elastomer and 20 parts of PTFE. The solid components in the mixture were coagulated by addition of potash alum thereto, collected and dried.

In the thus obtained solid composition, PTFE was not fibrillated, and the cohesive failure was easily produced. When kneaded strongly, PTFE was fibrillated, and the resulting composition showed a good adhesive property as in Example 1.

EXAMPLE 3

To a mixture of a low molecular weight elastomer having a number average molecular weight of 5,500 and modified with iodine atoms at the terminal positions (iodine content, 6.8% weight) (77 parts), triallyl isocyanurate (19 parts) and diisopropyl peroxydicarbonate (4 parts), PTFE fine powder (10 parts) was added and the resulting mixture was kneaded well until PTFE was fibrillated. The obtained composition showed almost the same adhesive properties as the composition obtained in Example 1.

The said composition was heated at 100° C. for 30 minutes, whereby the elastomer was vulcanized. The resulting composition showed a slight decrease in adhesive properties but still had sufficient adhesive properties for practical use.

EXAMPLE 4

A stretched microporous PTFE tape was dipped in a 50% by weight solution of a low molecular weight elastomer having a number average molecular weight of 5,500 or 8,000 in acetone and then dried. The thus obtained elastomer-impregnated PTFE tape showed a good adhesive property.

On both sides of the tape PTFE or polyethylene tapes were applied, and the resulting set was dipped in conc. sulfuric acid or ASTM #3 oil for one week. Neither deterioration of the adhesive composition nor separation of the tapes was observed.

The tape self-adhered but was easily separated. It was usable as an adhesive tape by winding it on an axis.

Comparative Example 1

A commercially available adhesive tape and a cloth adhesive tape were each applied on a PTFE or polyethylene tape and dipped in conc. sulfuric acid or ASTM #3 oil. After one day in case of conc. sulfuric acid or after one week in case of ASTM #3 oil, the tapes were separated.

Comparative Example 2

In the same manner as in Example 1 or 4 but using fluorine-containing elastomer having a number average molecular weight of 100,000, an adhesive composition and a PTFE tape were prepared. The obtained composition was not soft, and the obtained tape did not show any adhesive property.

EXAMPLES 5 TO 12

In the same manner as in Example 1 but using fluorine-containing elastomer having a number average molecular weight as shown in Table 1 in an amount as shown in Table 1, an adhesive composition was prepared. The properties of the obtained composition are shown in Table 1.

TABLE 1

| Example No. | Number average molecular weight of fluorine-containing elastomer | Amount of fluorine-containing elastomer (part) | Amount of PTFE*[(1)] (part) | Properties |
| --- | --- | --- | --- | --- |
| 5 | 5500 | 92 | 8 | Good adhesion |
| 6 | 7700 | 95 | 5 | Good adhesion |
| 7 | 3000 | 90 | 10 | A part of rubber flowed out; good adhesion |
| 8 | 3000 | 80 | 20 | Bleeding of rubber onto the surface slightly observed; good adhesion |
| 9 | 5500 | 83 | 17 | Good adhesion |
| 10 | 5500 | 30 | 70*[(2)] | Adhesive power somewhat weak |
| 11 | 3300 | 50 | 50 | Adhesive |
| 12 | 3300 | 25 | 75 | Adhesive property somewhat lowered |

Note:
*[(1)] PTFE fine powder
*[(2)] Comprising 36 parts of "Lubron L-5" (waxy low molecular weight PTFE produced by Daikin Kogyo Co., Ltd.)

Comparative Examples 3 to 5

In the same manner as in Example 1, components as shown in Table 2 were mixed in a prescribed proportion to obtain an adhesive composition. The properties of the composition are shown in Table 2.

TABLE 2

| Comparative Example No. | Fluorine-containing elastomer Number average molecular weight | Part | Greasy fluorine-containing resin (part) | PTFE (part) | Properties |
| --- | --- | --- | --- | --- | --- |
| 3 | 5500 | 84 | — | 16*[(1)] | PTFE was not fibrillated; cohesive failure easily produced |
| 4 | — | — | Daifloil #50*[(2)] (90) | 10 | Daifloil flowed out |
| 5 | — | — | Daifloil #50*[(2)] (80) | 20 | Daifloil flowed out |

Note:
*[(1)]"Lubron L-5" used
*[(2)]Low molecular weight polychlorotrifluoroethane produced by Daikin Kogyo Co., Ltd.

What is claimed is:

1. An adhesive composition comprising a fluorine-containing eslatomer having a number average molecular weight of 3,000 to 10,000 and fibrillated polytetrafluoroethylene, the weight ratio of said elastomer and said polytetrafluoroethylene being from 50:1 to 1:1.

2. The adhesive composition according to claim 1, wherein the elastomer is partially vulcanized.

3. The adhesive composition according to claim 1, wherein the polytetrafluoroethylene is porous.

4. The adhesive composition according to claim 1, wherein the weight ratio of said elastomer and said polytetrafluoroethylene is from 20:1 to 4:1.

* * * * *